United States Patent [19]

Markle

[11] Patent Number: 4,467,053

[45] Date of Patent: Aug. 21, 1984

[54] PROCESS FOR PRODUCING AN EXPANDABLE SILICONE RESIN

[75] Inventor: Richard A. Markle, Columbus, Ohio

[73] Assignee: Rosemount Inc., Eden Prairie, Minn.

[21] Appl. No.: 566,276

[22] Filed: Dec. 28, 1983

[51] Int. Cl.$^3$ ................................................ C08J 9/02
[52] U.S. Cl. ...................................... 521/128; 521/77; 521/129; 521/154
[58] Field of Search ...................... 521/129, 154, 128

[56] References Cited

U.S. PATENT DOCUMENTS 2,803,606  8/1957  Weyer .................................. 521/154

Primary Examiner—Morton Foelak
Attorney, Agent, or Firm—Kinney & Lange

[57] ABSTRACT

A process for the production of an expandable silicone resin includes reacting a substantial amount of the silanol (SiOH) groups present in the resin to form siloxane bonds and water, and heating the resin to a temperature above the resin's melting point, at which chemical reaction (condensation) of the silanol groups occur. The reaction increases the molecular weight of the resin and decreases the amount of water that must be removed during a subsequent foaming step, thereby controlling the rate and extent of foaming which can occur. The resin is solidified, pulverized and size-reduced to a powder form. The resin powder is blended with a minor amount of a particulate inert filler which is coated with a silicone resin curing catalyst and also with a minor amount of blowing agent (powder). The dry powder blend is then thermally fused for a closely-controlled, short duration, time at a temperature near the lower end of the blowing agent's gas-generating temperature range. The fused mass is ground to a powdered form to produce an expandable resin.

12 Claims, No Drawings

PROCESS FOR PRODUCING AN EXPANDABLE SILICONE RESIN

BACKGROUND OF THE INVENTION

1. Field of the Invention

The present invention relates to a method of partially thermally condensing an expandable silicone resin, and in particular, it relates to a process for modifying a commercial silicone resin so that cellular expansion is substantially uniform and controlled, with no large voids or overexpanded pores ($\geq 1$ mm) formed.

2. Description of the Prior Art

Cellular expansion of silicone resins is described in the Weyer U.S. Pat. No. 2,803,606. A silicone resin is melted and filler, foaming agent and catalyst are added. The molten mixture is allowed to solidify and is then powdered by crushing. The crushed mix is poured into a mold and heated above the decomposition temperature of the blowing agent. The foamed resin is then cured at a temperature above the decomposition temperature.

SUMMARY OF THE INVENTION

The present invention includes a process for producing an expandable siloxane polymer wherein a silicone resin is heated to a temperature above its melting point at which chemical reaction (condensation) of silanol groups occurs, resulting in the formation of molecular siloxane bonds and water. The reaction slightly increases the molecular weight of the resin and decreases the amount of water that must be removed during the subsequent foaming step, thereby controlling the rate and extent of foaming which can occur. The resin is then cooled and pulverized to a powdered form. An inert filler is preferably coated with a catalyst and then dry blended with the powdered silicone resin and a blowing agent. The dry blend is then preferably fused at a temperature above the melting point of the resin but near the lower end of the blowing agent's gas-generating temperature range, to produce a fused mass of substantially uniformly-dispersed resin and blowing agent. The fused mass is then ground into a powder for use as an expandable silicone resin formulation.

DETAILED DESCRIPTION OF THE PREFERRED EMBODIMENTS

The present invention includes a process for thermally actuating a controlled level of silanol condensation in a commercial silicone resin so that the formulated silicone resin foaming powder expands at a controlled rate, producing an expanded or foamed resin having a uniform, largely closed pore size of less than 1 mm, and preferably of less than 0.3 mm.

Siloxane polymers within the scope of the present invention include those which have the unit formula:

$$R_nSiO_{(4-n/2)}$$

where "R" is methyl, ethyl, vinyl or phenyl and most preferably is a combination of methyl and phenyl, in a mole ratio of approximately 0.67/1 to 1.5/1.0 phenyl/methyl, and where "n" has an average value from 1 to 1.5 inclusive. Specific examples of siloxane polymers that are usable within the process of the present invention include Dow Corning Resins Z-6018 and QR4-3136, manufactured by Dow Corning Corporation of Midland, Mich. The preferred resin is Dow Corning Resin QR4-3136.

A blowing agent, a catalyst and a filler are combined with the thermally partially precondensed silicone resin in a closely-controlled manner to provide an expandable resin powder characterized by a controlled rate of expansion resulting in a reasonably uniform pore size.

Any blowing agent exhibiting thermal production of a gas above the softening point of the particular siloxane polymer being used is within the scope of the present invention. A preferred blowing agent is manufactured by Olin Chemicals of Stamford, Conn. and is identified by the trademark OPEX 93. It is believed that OPEX 93 is a nitrogen releasing blowing agent and includes 93 percent by weight dinitroso pentamethylene tetramine and 7% inert filler.

The catalyst employed is of a type that cures the resin after the resin has expanded. Any suitable siloxane polymer curing catalyst can be used. A particularly suitable curing catalyst is manufactured by the Anderson Development Company of Adrian, Mich. and is choline octoate which is a 100% active, dark, viscous liquid. The choline octoate must be dissolved in n-butyl alcohol and is preferably dissolved by mixing one part choline octoate with three parts alcohol. It has also been found that an acceptable product can be made without the catalyst.

Any suitable filler may be used in the process of the present invention. Preferably, a diatomaceous earth is used. Suitable diatomaceous earth fillers are produced by the Manville Products Corporation under the trademark of Celite 350 and by the Witco Chemicals Corporation under the trademark Kinite 200. The diatomaceous earth preferably has an approximately neutral pH as measured in an aqueous slurry of one gram of the filler in 5-10 ml of distilled water.

The process includes preparing the silicone resin in a manner that removes a substantial amount of the water which may be released therein from uncondensed silanol groups. One suitable method of removing the water from the resin includes heating the resin above its melting point at a temperature where silanol condensation forms siloxane bonds and free water at an easily-measured, controllable rate until there is about a 1% weight loss, due primarily to evaporation of water.

A proper, or acceptable, time and temperature schedule for precondensation of silanol groups in the silicone resin, to produce a resin with the balance of properties needed to formulate a foamable powder with the required foaming properties, can be determined by heating measured sample quantities of resin from a lot of resin at precisely-timed intervals in an oven at a carefully controlled temperature. A convenient and acceptable procedure is to heat a plurality of 100-200 gram resin batches in a 350° F.±5° F. oven for precisely-timed 5 minute intervals, starting with 10 minutes for the first batch. Checking the expansion rate and foam properties of the foam made from the foamable powder using these resin samples should result in one "best" expansion. The heating time resulting in the best expansion shall be called $\beta$ minutes. $\beta$ minutes has been found to vary due to lot-to-lot differences in the silicone resin, or changes in a lot during storage, from 10 minutes to at least 90 minutes.

After heating a desired amount from the lot of resin for $\beta$ minutes, the resin is then permitted to cool to a solid mass. The solid mass is then reduced (ground or crushed) to a powder form.

The choline octoate silicone resin curing catalyst is prepared for use by mixing with n-butyl alcohol as previously described. The choline octoate/n-butyl alcohol mixture is then mixed with ethyl alcohol. The alcohol/choline octoate mixture is poured onto the diatomaceous earth to form a slurry. The diatomaceous earth serves as a carrier for the choline octoate so that the choline octoate is evenly distributed within the resin as will be subsequently discussed. The slurry is heated in an oven until the ethyl alcohol has evaporated, leaving a catalyst coating on the diatomaceous earth.

The finely ground silicone resin and minor amounts of the choline octoate coated diatomaceous earth and the blowing agent are then dry blended together. The resin, choline octoate coated diatomaceous earth and blowing agent mixture is then heated to approximately 240° F. to 270° F. and held until the mixture is nearly all fused (approximately 6 minutes). The fused mixture is then crushed to a powder. The powder is then a foamable powder which can be subsequently heated above the temperature needed to activate the blowing agent to form an expanded silicone resin foam.

For larger batches, the inert filler can be added directly in the initial heating step and the blowing agent added at a temperature that does not generate substantial amounts of gas. The mixture is then cooled and reduced in size to produce the foamable powder.

Although the reasons for the controlled rate of expansion and uniform pore size are not fully understood, the thermal treatment of the silicone resin prior to the addition of any catalyst provides vastly improved results. The resin heating step serves two functions. First, the heating step removes a substantial amount of latent water present in the resin as part of the silanol groups. The heating step removes approximately 1% to 3% of the resin, by weight, and the weight loss is believed to be mostly water. Approximately 20% to 70% by weight of the latent water present in the resin is evaporated. The latent water is released as free water from the condensation reaction, which is the reaction of the hydroxyl end groups, for example:

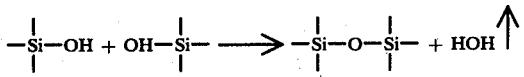

As noted, the free water is evaporated. Second, the reaction results in an increase in polymer molecular weight and viscosity. The decreased latent water content and the increase in viscosity is due to a slight start in the cross-linking of the siloxane polymer. The increased viscosity is believed to result in a slower, more controlled foam cell growth rate. Additionally, the slower cell growth results in more cells being initiated since more time is available for significant expansion to occur at a given rate of gas formation from the blowing agent. An increased number of cells results in smaller, more uniform cells of less than approximately 1 mm in diameter and generally less than 0.3 mm. A further closely-related factor is that less water (steam) is available to act as a separate, unpredictable blowing agent in addition to the $N_2$ gas being generated from the dinitroso pentamethylene tetramine blowing agent.

The following example is for illustrative purposes only and should not be construed as limiting the present invention.

EXAMPLE 1

250 grams of Dow Corning QR4-3136 silicone resin was placed into a 16 ounce seamless tin and heated in a circulating air oven. The oven was set at 350° F.±5° F. and the polymer was heated for 30 minutes. The temperature in the oven was monitored by a thermocouple sensing, digital readout thermometer accurate to ±1° F. The temperature inside of the oven near the location where the resin was placed was monitored for sufficient time prior to inserting the seamless tin containing the resin to insure that the proper temperature was being maintained by the oven.

After several minutes, the silicone resin began to melt and formed a clear, viscous, almost colorless liquid, which began to boil and foam in about 10 minutes. The molten resin was hand stirred at 10 and 20 minute intervals. The molten resin was stirred to facilitate evaporation of the free water condensed from the resin and to insure that the resin would not boil out of the container.

After approximately 30 minutes, the container was removed from the oven and the resin was allowed to cool and solidify. The resin was removed from the container and broken into pieces small enough to feed into a Mikro-Pulverizer Model 7942 SH, sold by Pulverizing Machinery Company, Summit, N.J. The resin was pulverized to a size to pass through a 0.035-inch screen in the Mikro-Pulverizer.

A stock solution of choline octoate catalyst in n-butyl alcohol was prepared by mixing 10 grams of choline octoate and 30 grams of n-butyl alcohol in a glass bottle. A plastic bottle is unacceptable and a paper, coated paper or meal foil-lined cap are also not acceptable since diffusion and evaporation of alcohol occurs through plastic over time, changing catalyst concentration, and paper and foil disintegrates or reacts with the catalyst and contaminates it.

Approximately 400 grams of diatomaceous earth having a pH of approximately 7.0 made by J. T. Baker Company was placed into a glass beaker. Approximately 554 μl of a 25 weight percent solution of choline octoate in n-butyl alcohol were added to 1.1 liters of ethyl alcohol in a second beaker. The ethyl alcohol and choline octoate/n-butyl alcohol were mixed well and poured into the glass beaker containing the particular filler (diatomaceous earth). The mixture was then stirred thoroughly and poured into a stainless steel pan.

The mixture in the pan was placed in an air circulating oven which was preset at approximately 230° F. The mixture was heated for approximately 1.5 hours with occasional mixing to insure that the catalyst was evenly deposited on the filler particles as the ethyl alcohol evaporated. When the filler appeared to be dry and the odor of the ethyl alcohol was gone, the mixture was cooled and the pan and its contents were weighed. The pan and contents were then placed back into the 230° F. oven for approximately 15 minutes and re-weighed. This procedure was repeated until no further weight decrease was recorded. The dry weight of the catalyst-coated filler was approximately 400.5±0.1 grams.

Approximately 200 grams of the pulverized silicone resin, 40 grams of the choline octoate-coated diatomaceous earth and 6 grams of Opex 93 foaming agent produced by Olins Chemicals were hand mixed. The mixture was powdered and blended by passing it through the Mikro-Pulverizer containing the 0.035-inch screen.

The powdered mixture or blend was then evenly distributed into two dripping pans so that the dry powder thickness was approximately 0.75 inches. Uniform thickness over the entire pan was insured since the subsequent heating step was known to be quite sensitive to the thickness of the powdered mixture or blend due to the thermal conductivity of the powdered mixture.

The dripping pans were placed side-by-side in the center of the air circulating oven which was preheated to a carefully measured 270° F.±2° F. The blend was heated for approximately 6 minutes. The result was an extensively, but not completely, fused continuous mass. The pans were removed from the oven and the fused mass was permitted to cool to ambient temperature. The now hard, fused mass was removed from the pan and broken into small enough pieces to feed into the Mikro-Pulverizer using a 0.062-inch screen. The formulated powdered mixture (resin, filler, blowing agent, catalyst), which is called a foamable powder, was then ready for heating and production of a cellular product.

To characterize the foamed cellular product, the following procedure was used. A 1-gram sample of the foamable powder was weighed and placed in a ½-dram glass vial. The vial was tapped lightly on a firm surface to obtain an evenly compacted powder. When the powder level ceased to decrease from tapping, the upper powder level was marked and the vial placed in a 50-ml Pyrex beaker. The beaker and the vial were placed into the air circulating oven and held at approximately 400° F. for approximately 30 minutes. The vial and the beaker were removed and cooled and the degree of expansion of the product in the vial (now an expanded resin or foam) was measured.

The resulting expanded foam was approximately 380% of the unexpanded powder volume. The foam was characterized by reasonably uniform, easily visible pores with a minimum of large pores both at the glass vial surface and internally. The foam was bonded to the glass wall of the vial strongly enought so that it was difficult to remove by physically tapping the vial on a hard surface. The foam was removed as a unitary mass from the vial and cross-sectional down the middle. The foam was characterized by a uniform pore size with no greatly over-expanded regions and no pores greater than approximately 1 mm in diameter. No regions having a pore size diameter of greater than 1 mm were noticable at the bottom of the sample, where the formation of larger pores is usually first observed.

The foam was also tested for hardness. A tin tube approximately 4 inches long and ⅜ inches in diameter was filled with the powdered mixture of silicone resin, blowing agent and catalyst-coated diatomaceous earth. One end of the tube was crimped closed and the other end of the tube was left open. The tube was placed in a jar with the end up and the jar and tube were placed in an air circulating oven at approximately 400° F. for thirty minutes to form a foam in the tube. The tube was removed and cooled. A jeweler's saw was used to cut the tube into three quarter-inch length sections and the outer metal covering was removed from a middle section. An Exacta durometer by Industries, Inc. of Pa., was used to measure the hardness of the foam formed. Fiver readings produced a mean durometer hardness of approximately 15 on the Shore A Scale.

EXAMPLE 2

The procedure of Example 1 was substantially followed except that the choline octoate catalyst was not used and the inert filler was added without any catalyst coating. The results were substantially the same as in Example 1.

In one working embodiment, the foamable powder was used to support lead wires in a temperature sensor that is subjected to high vibration and shocks. The controlled expansion which produces substantially uniform pores prevents the powder from blowing out of the housing which houses the lead wires. The foamed powder also adheres very well to the inside walls of the housing and provides better support to the lead wires than a foamed resin having an occasionally large pore. If the lead wires run through a large pore, the extra freedom of the wire could lead to a potential break of the wire from vibrations or shocks.

Although the present invention has been described with reference to preferred embodiments, workers skilled in the art will recognize that changes may be made in form and detail without departing from the spirit and scope of the invention.

What is claimed is:

1. A process for the production of an expandable silicone resin containing powder comprising:
   heating a silicone resin having a formula of: $R_nSiO_{4-n/2}$ where R is selected from the group consisting of methyl, ethyl, vinyl and phenyl radicals and n has an average value of from 1 to 1.5 inclusive, to a temperature to condense the latent water into free water until approximately 20% to 70% of the latent water has been condensed and evaporated to effect an increase in molecular weight of the silicone resin;
   blending a particulate inert filler and a blowing agent in an environment in which the blowing agent does not generate substantial amounts of gas with the silicone resin to form a mixture, the blending of the blowing agent and inert filler with the resin being either separately or simultaneously;
   cooling the mixture to a solidified mass;
   reducing the solidified mass into a powder which expands when heated above the gas-generating temperature of the blowing agent.

2. The process of claim 1 wherein R is methyl and phenyl substituents in a mole ratio of approximately 0.67/1 to 1.5/1.0, phenyl/methyl.

3. The process of claim 1 wherein the filler is diatomaceous earth.

4. The process of claim 3 wherein the diatomaceous earth has a pH of approximately 7.0.

5. The process of claim 1 and further including coating the inert filler with a cross-linking catalyst.

6. The process of claim 5 and further including cooling the resin after initially heating and reducing in size the resin to a powdered form and dry blending the catalyst-coated filler with the powdered resin.

7. The process of claim 6 and further including dry blending the blowing agent and the resin and the catalyst-coated inert filler to form a mixture.

8. The process of claim 7 and further including fusing the mixture by heating to a temperature above the melting point of the resin but less than the blowing agent's gas-generating temperature.

9. The process of claim 7 wherein the temperature for fusing the blend is approximately in the range of 240° F. to 270° F.

10. The process of claim 5 wherein the catalyst is choline octoate.

11. The process of claim 1 wherein the blowing agent is dinitroso pentamethylene tetramine.

12. The process of claim 1 wherein the silicone resin is initially heated to approximately 350° F.±5° F. for approximately 10 to 90 minutes.

* * * * *

UNITED STATES PATENT AND TRADEMARK OFFICE
CERTIFICATE OF CORRECTION

PATENT NO. : 4,467,053

DATED : August 21, 1984

INVENTOR(S) : Richard A. Markle

It is certified that error appears in the above-identified patent and that said Letters Patent is hereby corrected as shown below:

In column 1, line 12, "($\geq$ 1 mm)" should read --($\leq$ 1 mm)--.

In column 1, line 58, the equation "$R_n SiO_{(4-n/2)}$" should read: --$R_n SiO_{\frac{4-n}{2}}$--

In column 5, line 38, "enought" should read --enough--.

In column 5, line 41, "cross-sectional" should read --cross-sectioned--.

In column 5, line 46, "noticable" should read --noticeable--.

In column 5, line 62, "Fiver" should read --Five--.

UNITED STATES PATENT AND TRADEMARK OFFICE
CERTIFICATE OF CORRECTION

PATENT NO. : 4,467,053

DATED : August 21, 1984

INVENTOR(S) : Richard A. Markle

It is certified that error appears in the above-identified patent and that said Letters Patent is hereby corrected as shown below:

In claim 1, lines 3 and 4, the formula "$R_nSiO_{4-n/2}$" should read: -- $R_nSiO_{\frac{4-n}{2}}$ --

Signed and Sealed this

Thirtieth Day of April 1985

[SEAL]

Attest:

DONALD J. QUIGG

Attesting Officer

Acting Commissioner of Patents and Trademarks